US011777114B2

(12) United States Patent
LaGrange et al.

(10) Patent No.: US 11,777,114 B2
(45) Date of Patent: Oct. 3, 2023

(54) CASCADING STACK ELECTROCHEMICAL FUEL CELL

(71) Applicant: Infinity Fuel Cell and Hydrogen, Inc., Windsor, CT (US)

(72) Inventors: Jay LaGrange, New Hartford, CT (US); John Fayer, Bristol, CT (US); James McElroy, Suffield, CT (US); William F. Smith, Suffield, CT (US)

(73) Assignee: INFINITY FUEL CELL AND HYDROGEN, INC., Windsor, CT (US)

( * ) Notice: Subject to any disclaimer, the term of this patent is extended or adjusted under 35 U.S.C. 154(b) by 102 days.

(21) Appl. No.: 16/766,998

(22) PCT Filed: Nov. 27, 2018

(86) PCT No.: PCT/US2018/062567
§ 371 (c)(1),
(2) Date: May 26, 2020

(87) PCT Pub. No.: WO2019/104305
PCT Pub. Date: May 31, 2019

(65) Prior Publication Data
US 2020/0321639 A1    Oct. 8, 2020

Related U.S. Application Data

(60) Provisional application No. 62/590,876, filed on Nov. 27, 2017.

(51) Int. Cl.
*H01M 8/04119*    (2016.01)
*H01M 8/24*    (2016.01)
*H01M 8/2483*    (2016.01)

(52) U.S. Cl.
CPC ..... *H01M 8/04149* (2013.01); *H01M 8/2459* (2016.02); *H01M 8/2483* (2016.02)

(58) Field of Classification Search
CPC .......... H01M 8/04149; H01M 8/2459; H01M 8/2483
See application file for complete search history.

(56) References Cited

U.S. PATENT DOCUMENTS

| | | | |
|---|---|---|---|
| 2006/0210845 A1 | 9/2006 | Kim et al. | |
| 2007/0128478 A1* | 6/2007 | Ballantine | H01M 8/04291 429/513 |
| 2007/0207353 A1 | 9/2007 | Logan | |
| 2009/0087698 A1 | 4/2009 | Huth et al. | |
| 2010/0028734 A1* | 2/2010 | Ballantine | H01M 8/2495 429/413 |
| 2010/0104900 A1 | 4/2010 | Kashino et al. | |
| 2013/0236801 A1 | 9/2013 | Schaack et al. | |
| 2014/0072889 A1* | 3/2014 | McElroy | H01M 8/222 429/410 |

OTHER PUBLICATIONS

International Search Report for PCT/US2018/062567 dated Mar. 19, 2019.

* cited by examiner

*Primary Examiner* — Anca Eoff
(74) *Attorney, Agent, or Firm* — Bachman & LaPointe, P.C.

(57) ABSTRACT

A fuel cell comprising a series of cascaded cell stacks comprising at least one humidifier-degasser coupled to the cell stacks proximate a stack inlet; the at least one humidifier-degasser comprising at least one degasification section fluidly coupled upstream of at least one humidifier section; and at least one inert concentrator cell coupled downstream from the cell stacks proximate a stack vent.

6 Claims, 5 Drawing Sheets

CASCADING STACK ELECTROCHEMICAL FUEL CELL

BACKGROUND

The present disclosure is directed to an electrochemical fuel cell that simplifies fuel cell construction by integrating reactant humidification, product water management, internal gas flow management and inert concentration to minimize venting within the stack eliminating many separate components while increasing stack efficiency.

Proton Exchange Membrane (PEM) Fuel cells have the potential to provide clean efficient power generation from hydrogen and from oxygen sourced from either air or pure oxygen. A detailed explanation of a cascaded PEM fuel cell design and operation can be found in U.S. Pat. Nos. 6,251,534 and 8,129,057 to McElroy et al. incorporated by reference herein. However, all PEM fuel cells must manage the removal of product water created at the cathode and manage various impurities that may be present in reactants. Additionally, it is desirable to humidify reactants to increase performance and life. In the case of fuel cells intended for air-independent applications, it is desirable to minimize parasitic power losses and optimize reactant utilization to achieve maximum system efficiency. It is also desirable to maintain a flow of reactant to evenly distribute reactants and to control and direct the concentration of impurities so minimal reactant is lost when stack venting occurs. Finally, in the case of fuel cells intended for zero-gravity operation it is desirable for the fuel cell to be able to operate free of gravity with no parasitic power losses and to be able deliver the fuel cell product water free of all gasses, including dissolved gasses, to eliminate the need or additional downstream systems to perform liquid-gas phase separation in zero gravity.

Achieving a single system that does all of these functions has historically been challenging. Humidifying reactants with product water naturally exposes the water to hydrogen and oxygen allowing some of these gasses to dissolve into the water so they are present when water exits the stack. Flowing gasses through the stack to distribute reactants and sometimes remove cathode water often requires active pumps or compressors requiring parasitic power or requires flow ejectors that are limited in range of operation.

Fuel cells utilizing solid polymer membranes to generate power require carefully controlled hydration of the membrane under controlled temperatures to achieve optimal hydrogen ion transport across the material. Extensive research has been and is being conducted regarding the ideal temperature, pressure, and humidity conditions needed to achieve efficient conditions. A current popular approach to achieving these conditions is to humidify the product gasses prior to use inside of the cells at a rate which provides moisture to the membrane without flooding the fuel cell flow fields to the point of causing significant pressure drop and loss of efficiency.

Systems seeking to achieve high reactant utilization benefit from increased purity of gasses and from flow of at least one reactant at approximate 2 stoichiometric rate. For this reason many current systems seeking to increase the efficiency of solid polymer based fuel cell systems focus on both acquiring supplies of reactants with high degrees of purity and on utilizing the fuel cell system balance-of-plant to flow and distribute the gasses. Both the process of humidification of gas reactants and circulation for the purposes of high utilization are known to consume non-trivial amounts of power as well as adding extra weight and bulk to system/cell design. In addition, many system configurations such as that described above do not take advantage of mechanisms inside the stack to accomplish efficiency goals and instead require placement of power consuming components throughout the fuel cell system for the purpose of circulating gasses.

In PEM fuel cell systems product water must be managed. Excess product water needs to be removed. Product water can be managed actively or passively. Active water management in most PEM fuel cells currently removes product water from the surface of the gas diffusion layer (GDL) on the cathode side of a cell by entrainment with flowing air or oxygen. Flowing air or oxygen to remove excess product water works. However, it requires a flow of air or oxygen and creates a two-phase gas/water mixture that needs to be managed. In zero gravity environments, management of a two-phase gas/water mixture is inherently difficult.

Passive water management techniques for a small number of fuel cell designs remove product water by use of a porous media within each cell that has a "bubble point" that will resist gas intrusion. In these designs water will transport across the porous media but gas will not cross over up to the bubble point limit. Dissolved "gases" will however transport along with the product water.

Fuel cells are required to provide proper humidification to the components to prevent dry-out and part failure. Prior art PEM fuel cells have incorporated in-stack humidifiers that have used fuel cell product water to humidify the fuel cell electrolyte. These devices did not remove all gases present in the product water. Also, prior art zero-gravity fuel cells have employed in-cell static water removal (NASA Gemini) approaches.

Fuel cell designs must also manage reactant flows within the stack. There are active and passive reactant flow management techniques.

Traditional reactant management schemes in stacks which reuse a supply of hydrogen gas after it has passed through a stack, include methods of directing this gaseous hydrogen back to the top of the stack. This can be done by use of devices such as gas pumps, condensers, fans, and the like. Illustrations of such a recirculation based system are shown in FIGS. 1, 2, and 3.

It can also be seen that in such systems devices must be included to separate liquid, such as water, from the circulating fuel reactants. Such systems are in wide use and many novel designs exist for the purpose of ensuring the maximum utilization of the reactant gas. However, because of the need for traditional pumps, condensers and phase separators, such systems can be heavy and less reliable than systems that do not require them.

In FIG. 1 (the left most illustration) a schematic diagram of an alkaline power plant is shown in which reactant hydrogen is recirculated to remove product water from the cell stack. In this process product water evaporates into the recirculating hydrogen stream and this water vapor is condensed into liquid water as the recirculating stream passes through the condenser. The two-phase mixture stream passes into the pump separator where the liquid water is removed from the stream centrifugally and is discharged into a water collection system. The dried hydrogen returns to the power plant to repeat the cycle.

At FIG. 2, (center schematic) an illustration of an "active" PEM power plant is shown. The PEM power plant uses one or two recirculating reactant streams to remove water from the cell stack. Whether one or two recirculating streams is/are used is a determination made by individual developers. Because PEM cells produce water as a liquid, in this concept the water is entrained in the recirculating stream(s) as it (they) pass through the cell stack. The water laden stream(s) is (are) pumped through a separator(s), such as a centrifugal separator, where water is removed from the stream and discharged to a water collection system. The dried stream(s) is (are) returned to the power plant to repeat the cycle.

FIG. 3 shows a schematic of an advanced product water removal (APWR)-PEM power plant. It requires no gas circulation for water removal and no rotating components for gas circulation or water removal from circulating streams. In the APWR-PEM approach, porous media are used to transfer liquid product water from the cathode face, where it forms, across the oxygen reactant space, to a porous water-filled plate at the back of the oxygen reactant space. A small pressure differential, across the porous plate/membrane, causes the water to flow from the wick side of the plate/membrane through the plate/membrane into a water discharge space behind the plate/membrane. The water spaces are joined by a manifold providing a route for the water to flow directly from the cell stack into a water collection system.

Recognizing the importance of system simplification and minimizing parasitic power to save reactant at low average power, the Gemini fuel cell power plant incorporated a water removal concept similar to APWR. In the Gemini approach, water was wicked from the cathode to a porous plate outside the stack to another porous plate through which it passed, again by pressure differential, to a water collection system.

This Gemini approach, although similar in concept, was a more complex and bulky arrangement than the APWR. This is because the porous plate was outside the stack. It also had the drawback of requiring the entire stack to be contained within an oxygen filled pressure vessel. The new APWR concept is made possible by materials and technology unavailable to Gemini but now broadly used for commercial and other applications.

Another technical issue for fuel cell design includes moving reactants through the stack without mechanical pumps. Circulation of hydrogen can be performed using an electrochemical hydrogen pump. Stacks can be designed to circulate hydrogen which has passed completely through the cells of the unit and which can still be utilized as a reactant. In systems seeking to minimize use of moving parts and costly supports, these pumps can be of an electrochemical nature whereby hydrogen is driven to desired locations through ionic transport rather than through the use of traditional mechanical hydrogen pumps.

Such systems have been developed and tested, but were implemented in a manner that required circulation through all or large groups of cells requiring high levels of current. The subject innovation minimizes flow of reactant and reduces the electrical current required compared to prior art.

What is needed is a single fuel cell stack designed to solve all of these problems with no external devices and with little or no parasitic power or loss of reactants. The current invention does this by integrating all of the above functions within the fuel cell stack.

SUMMARY

In accordance with the present disclosure, there is provided a fuel cell comprising a series of cascaded cells comprising at least one humidifier-degasser coupled to the cell stacks proximate a stack inlet; the at least one humidifier-degasser comprising at least one degasification section fluidly coupled upstream of at least one humidifier section; and at least one inert concentrator cell coupled downstream from the cells proximate a stack vent.

In another and alternative embodiment, the series of cascaded cell stacks flow reactants serially.

In another and alternative embodiment, the at least one humidifier section comprises a first catalyzed water transport membrane and second catalyzed water transport membrane separated by a product water flow passage; an oxidant flow passage coupled to the first catalyzed water transport membrane opposite the product water flow passage; a fuel flow passage coupled to the second catalyzed water transport membrane opposite the product water passage; and a hydrogen rate controller electrically coupled to the second catalyzed water transport membrane.

In another and alternative embodiment, the degasification section comprises a membrane electrode assembly between a product water flow passage and a fuel flow passage; and an electrical potential being applied across the membrane electrode.

In another and alternative embodiment, the at least one inert concentrator cell comprises a hydrogen pump; the hydrogen pump comprising a membrane electrode assembly disposed between an input chamber and an output chamber configured to accept hydrogen flow through a fuel flow passage from at least one cell in the cascaded cells and the output chamber to a fuel inlet manifold of the at least one cell.

In another and alternative embodiment, the inert concentrator cell is configured to concentrate contaminant gases in the input chamber and pass hydrogen gas across the membrane electrode assembly into the fuel inlet manifold.

In another and alternative embodiment, the at least one catalyst is coupled to a surface of the first catalyzed water transport membrane and the second catalyzed water transport membrane.

In accordance with the present disclosure, there is provided a fuel cell comprising a hydrogen removal cell coupled to a fuel inlet, an oxidant inlet and a product water inlet, the hydrogen removal cell comprising a membrane electrode assembly between a product water flow passage and a fuel flow passage, an electrical potential being applied across the membrane electrode; a humidifier cell coupled downstream of the hydrogen removal cell, the humidifier cell comprising a first catalyzed water transport membrane and second catalyzed water transport membrane separated by a product water flow passage; an oxidant flow passage coupled to the first catalyzed water transport membrane opposite the product water flow passage; a fuel flow passage coupled to the second catalyzed water transport membrane opposite the product water passage; a hydrogen rate controller electrically coupled to the second catalyzed water transport membrane; and at least one inert concentrator cell coupled to at least one cell in a cascaded cell stack arranged in a cascaded configuration downstream of the humidifier cell, the inert concentrator coupled to a stack vent and configured to discharge contaminants from the fuel cell.

In another and alternative embodiment, the at least one inert concentrator cell comprises a hydrogen pump; the hydrogen pump comprising a membrane electrode assembly with an input chamber coupled to an anode chamber configured as a fuel flow passage from at least one cell in the cascaded cell stack and the membrane electrode assembly having an output coupled to a fuel inlet manifold of the at least one cell.

In another and alternative embodiment, the inert concentrator cell is configured to concentrate contaminant gases in the input chamber and pass hydrogen gas across the membrane electrode assembly into the fuel inlet manifold.

In another and alternative embodiment, the series of cascaded cell stacks flow reactants serially.

In another and alternative embodiment, the reactants comprise a gaseous fuel and a gaseous oxidant.

In another and alternative embodiment, the humidifier is configured to add moisture to the oxidant and to add moisture to the fuel responsive to an electrical current controlled by the hydrogen rate controller.

In accordance with the present disclosure, there is provided a process comprising flowing reactants through a cascaded fuel cell stack, the reactants comprising a fuel and an oxidant; degasifying a product water by use of reactant removal cells coupled in series to the cascaded fuel cell stack proximate a stack inlet for the reactants; humidifying the fuel and the oxidant with a portion of the product water by use of a humidifier cell coupled to the reactants and the product water proximate the hydrogen removal cell; concentrating contaminants from the reactants in an inert concentrator cell coupled to the cascaded fuel cell stack proximate a stack vent; and recirculating a portion of the fuel from the inert concentrator cell to at least one cell of the cascaded fuel cell stack In another and alternative embodiment, the degasifying the product water further comprises electrochemically reacting oxygen with hydrogen in the product water.

In another and alternative embodiment, the process further comprises electrochemically pumping hydrogen from a low partial pressure in the product water to a reactant pressure in the fuel being supplied to the at least one cell of the cascaded fuel cell stack.

In another and alternative embodiment, the process further comprises electrochemically injecting the hydrogen to the product water; reacting the dissolved hydrogen and a dissolved oxygen in the product water.

In another and alternative embodiment, a rate of hydrogen addition into the product water is controlled by a hydrogen rate controller, the hydrogen rate controller comprises a variable resistance potentiometer shunted across a membrane electrode assembly.

In another and alternative embodiment, the process further comprises venting the contaminants from the inert concentrator cell.

In another and alternative embodiment, the humidifying the fuel and the oxidant further comprises flowing the product water across a water transport membrane; evaporating the product water into the reactants from a surface of the water transport membrane the reactants contact In accordance with the present disclosure, there is provided a fuel cell comprising a series of cascaded cell stacks comprising at least one inert concentrator cell coupled downstream from the cell stacks proximate a stack vent.

In accordance with the present disclosure, there is provided a fuel cell comprising a series of cascaded cell stacks comprising at least one humidifier-degasser coupled to the cell stacks proximate a stack inlet; the at least one humidifier-degasser comprising at least one hydrogen removal section coupled via an MEA material to a reactant and a product water upstream of at least one humidifier section.

The present disclosure minimizes flow of the reactant and reduces the current required to operate the system.

Other details of the fuel cell are set forth in the following detailed description and the accompanying drawing wherein like reference numerals depict like elements.

DETAILED DESCRIPTION

Figures 1, 2, 3:
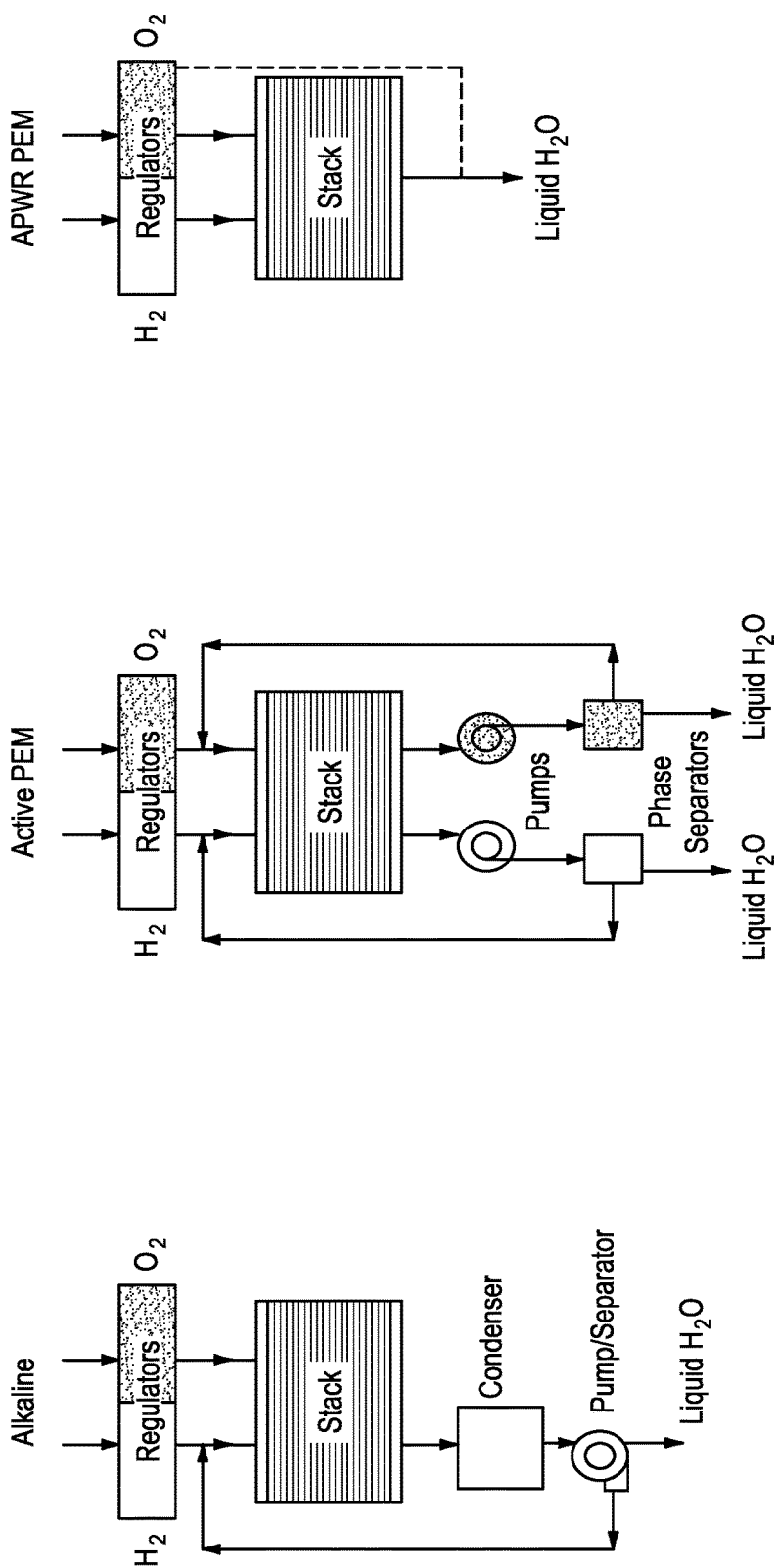
FIG. 1 is a prior art schematic diagram of an alkaline power plant.
FIG. 2 is an illustration of a prior art "active" PEM power plant.
FIG. 3 is a schematic of an advanced product water removal PEM power plant.
Figure 4:
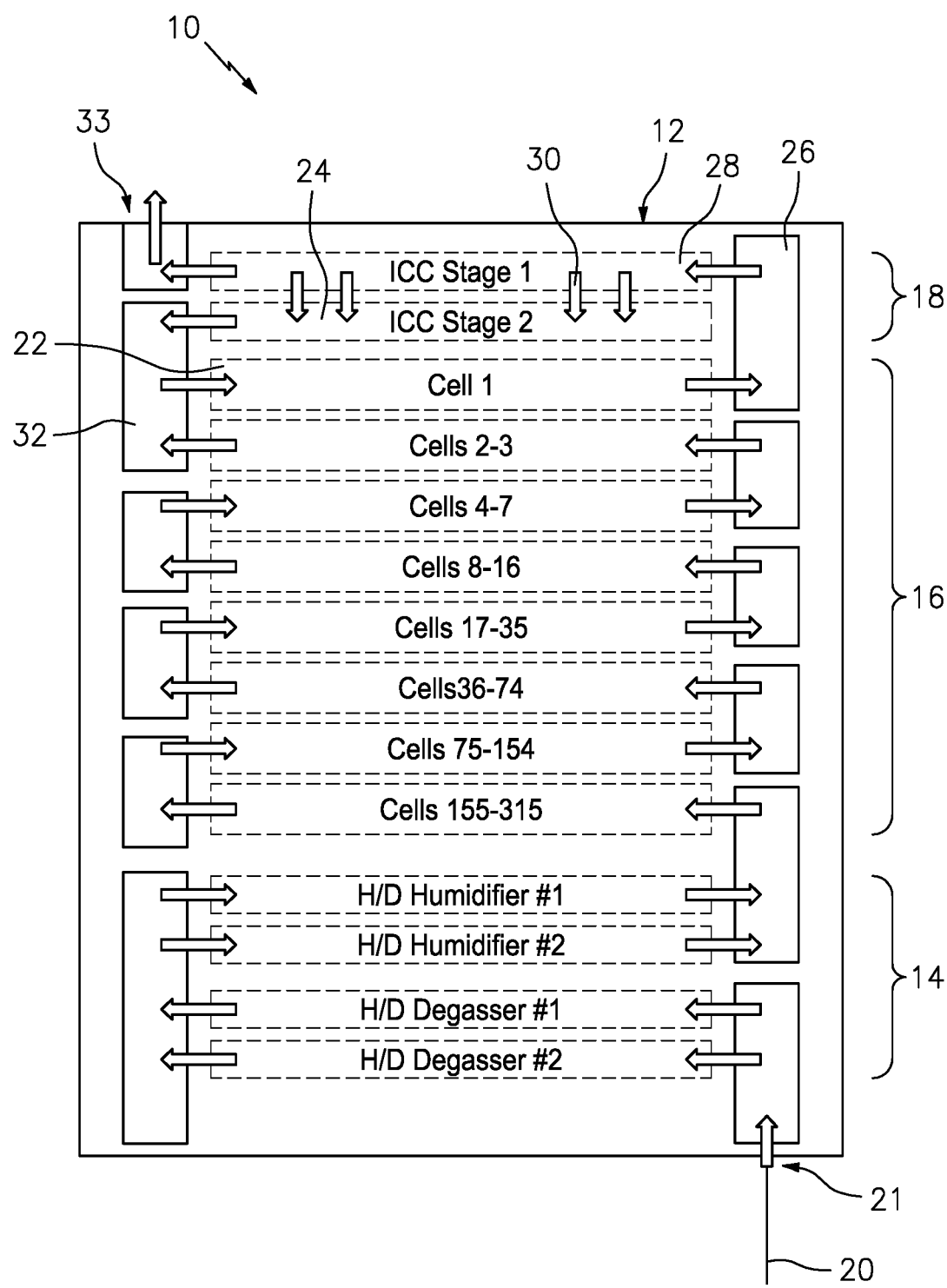
FIG. 4 is a schematic of an exemplary fuel cell cascading stack and an inert concentrator cell element and a humidifier-degasser cell element.

Referring now to FIG. 4, there is illustrated a fuel cell 10 having a fuel cell stack 12. The fuel cell stack 12 includes a humidifier-oxygen removal cell(s) 14, and utilizes a fluid management method that combines a stack cascade(s) 16 of cells with at least one hydrogen pump/inert concentrator 18. The fuel cell stack 12 is a non-flow though device that allows input of dry reactant gasses 20 into a stack inlet(s) 21, humidifies the reactants 20 utilizing fuel cell product water, then removes dissolved and gaseous reactants from the product water issuing from the stack so this product water can be easily managed even in zero gravity. After being humidified at 14, the fuel reactant 20 flows through a fuel cascade 16 as shown in FIG. 4. This cascade 16 allows a continuous flow of reactants at a 2:1 H2:O2 stoichiometric ratio from cell N to cell 1 (venting cell) 22 improving reactant distribution and utilization within each cell.

Cell 1 (and possibly more cells) 22 are coupled to an inert concentrator cell (hydrogen pump cell) 24. Reactant 20 in cell 1 22 flows through the anode chamber of cell 1 then into a manifold 26 that directs the reactant 20 flow into an input chamber 28 of the hydrogen pump cell 24. The hydrogen fuel 30 is then pumped across the ICC MEA back into an inlet manifold 32 of cell 1 22. In this manner, a flow is established within cell 1 22 and inert elements are concentrated in the inlet side of the Inert Concentrator Cell (ICC) 24.

Because of the very high efficiency of the H2 electrode, high concentrations of inert elements can be achieved (in order to later vent/purify) and the inert concentrator cell 24 can continue to operate. As these inerts reach a predetermined level the ICC voltage or current or both are used to create a signal to commence venting of the ICC 24 and cell 1 22. This venting process is repeated as often as necessary to maintain proper operation of cell 1 22 and the ICC 24. The venting is accomplished by use of a stack vent 33. The venting process can be based on an inert concentrator voltage/current, a shunt current bypass, a cell 1 voltage, and the like.

Figure 5:
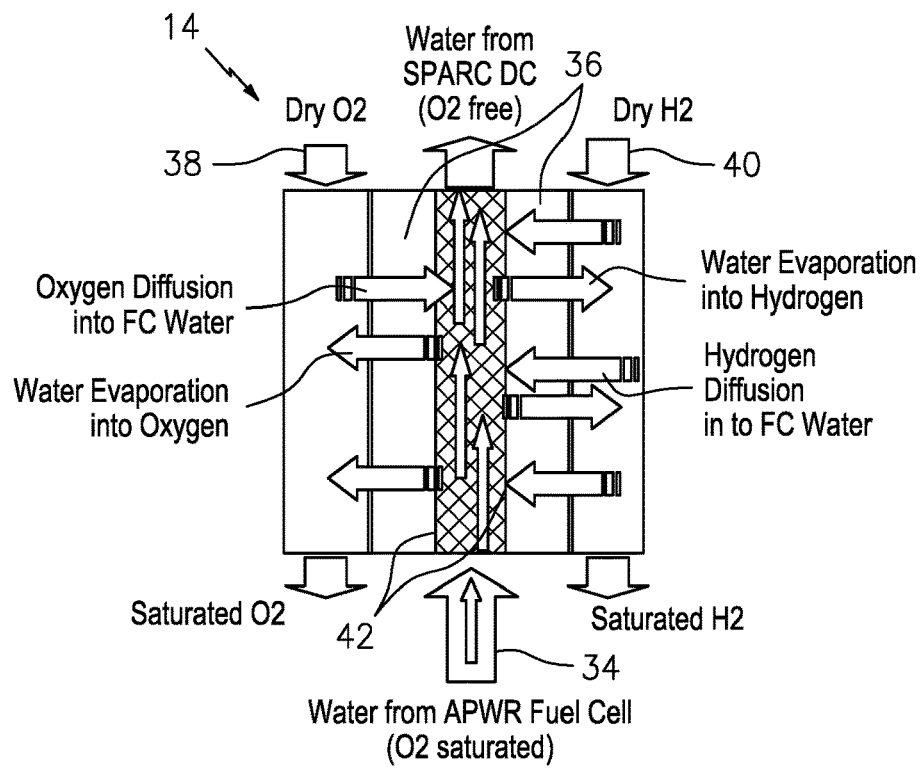
FIG. 5 is a schematic of the first stage of an exemplary humidifier-oxygen removal cell section of an exemplary fuel cell stack shown without a hydrogen injection circuit.

Referring also to FIG. 5, an exemplary humidifier-oxygen removal cell (H-ORC) 14 is shown. The humidifier-oxygen removal cell 14 primarily performs two functions. The humidifier-oxygen removal cell 14 humidifies incoming reactants 20 and removes oxygen from the product water. FIG. 5 shows the humidifier-oxygen removal cell 14 cross section in detail showing the arrangement and the processes carried out in the humidifier-oxygen removal cell 14. In the humidifier-oxygen removal cell 14, reactants 20 and product water 34 are separated by two catalyzed Nafion water transport membranes 36 (36a and 36b). In addition to Nafion other suitable proton conducting membranes include: (1) perfluorinated membranes other than Nafion, (2) partially fluorinated membranes, (3) non-fluorinated membranes, (4) nonfluorinated and composite membranes and the like. Some of the product water 34 flowing through the cell 14 migrates through the membranes 36 and evaporates from the membrane surfaces into the reactant 20 streams oxidant/oxygen 38, fuel/hydrogen 40, humidifying the reactants 20 (from FIG. 4).

At the same time that water 34 evaporates into the reactant streams, 38, 40, reactants 38, 40 are diffusing through the membranes and dissolving in the product water 34. The humidifier-oxygen removal cell 14 concept takes advantage of this characteristic to react oxygen in the product water with the diffusing hydrogen reducing the amount of oxygen 38 being carried from the humidifier-oxygen removal cell 14 dissolved in the product water 34: The surfaces of the water transport membranes 36 are catalyzed to promote reaction of the dissolved hydrogen 40 and oxygen 38 to water 34.

The diffusion rates of hydrogen 40 and oxygen 38 are proportional to their partial pressure differentials across their respective membranes 36. Consequently more hydrogen 40 transports to the product water 34, which is devoid of hydrogen 40, than oxygen 38 with which the product water 34 is saturated. The catalyst 42, on the surfaces of the membranes 36, promotes reaction of the dissolved gases to water 34. The result is that some of the dissolved hydrogen 40 and oxygen 38 are reacted and the product water 34 is partially degasified. However the ratio is not exact and the proportion of gases varies constantly depending upon operating point of the power plant and as a result of small but possible leaks of reactant 20 into the water stream 34.

The solution is the electrochemical reaction of excess hydrogen 40 in addition to hydrogen that diffuses to the product water stream 34 to assure that all oxygen 38 is consumed. The additional hydrogen 40 that is required is drawn electrochemically into the water 34. This is done by connecting a load across the catalyzed membrane 36b disposed between the product water 34 and the hydrogen reactant stream, completing an electrochemical circuit enabling this catalyzed membrane to function as a fuel cell membrane electrode assembly (MEA).

The MEA 46 has a hydrogen source 50 on the reactant stream side 52. On the surface 56 of the MEA, hydrogen 50 is ionized to protons and electrons by a catalytic reaction. The result is that when an external circuit 48 is connected, protons will flow through the MEA 36b from the higher energy state to the lower energy state while electrons flow through the external circuit 48 and the protons and electrons then combine with oxygen to form water 34 at the lower pressure (water side) electrode 54. The rate of hydrogen 50 flow, or addition, is limited by the current which is allowed to flow. The current, or hydrogen addition rate, is controlled by a hydrogen rate controller 58. In an exemplary embodiment, the hydrogen rate controller 58 can be a variable resistance potentiometer 58 shunted across the MEA 36b. This device 44 generates minute quantities of power and is able to acquire reactants to generate this power directly from the flow of fluids from the stack 12. The power generated is dissipated in the potentiometer 58.

At low resistance, hydrogen flow 50 is larger than at high resistance. Thus by controlling current flow hydrogen 40 addition-rate to the product water 34 is controlled. Using this controller 58 sufficient hydrogen 50 can be added to always consume all oxygen 38 present in the product water stream 34. The result is a stream 34 devoid of oxygen 38 but containing dissolved hydrogen 40.

Figure 6:
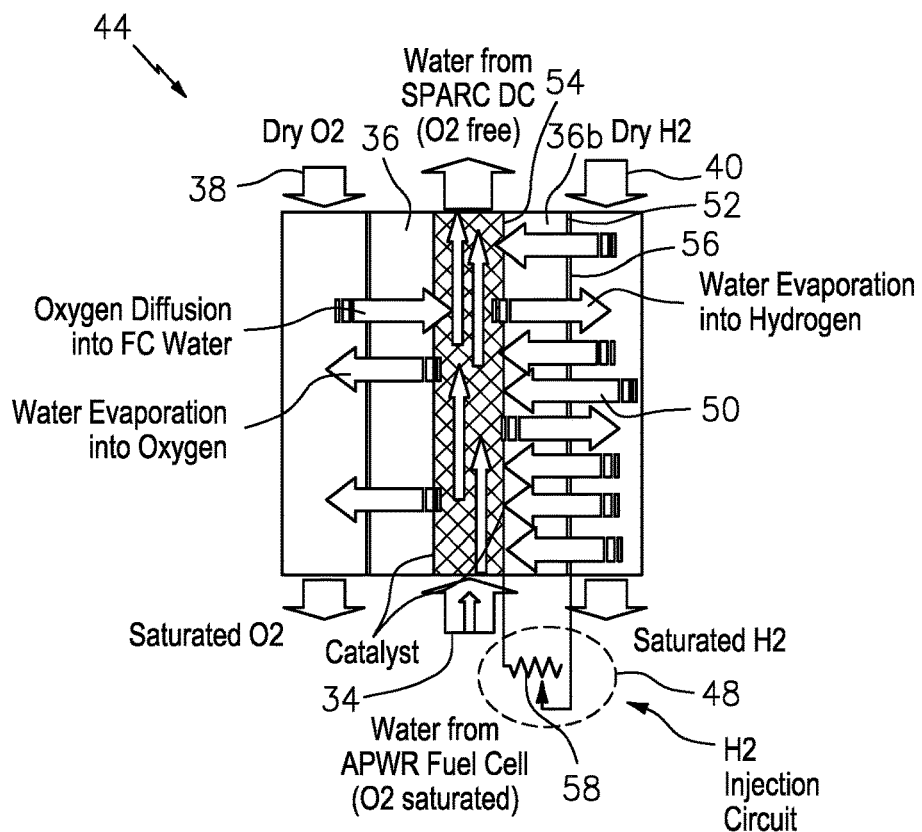
FIG. 6 is a schematic of the second stage of the same exemplary humidifier-degasser section of an exemplary fuel cell stack.
Figure 7:
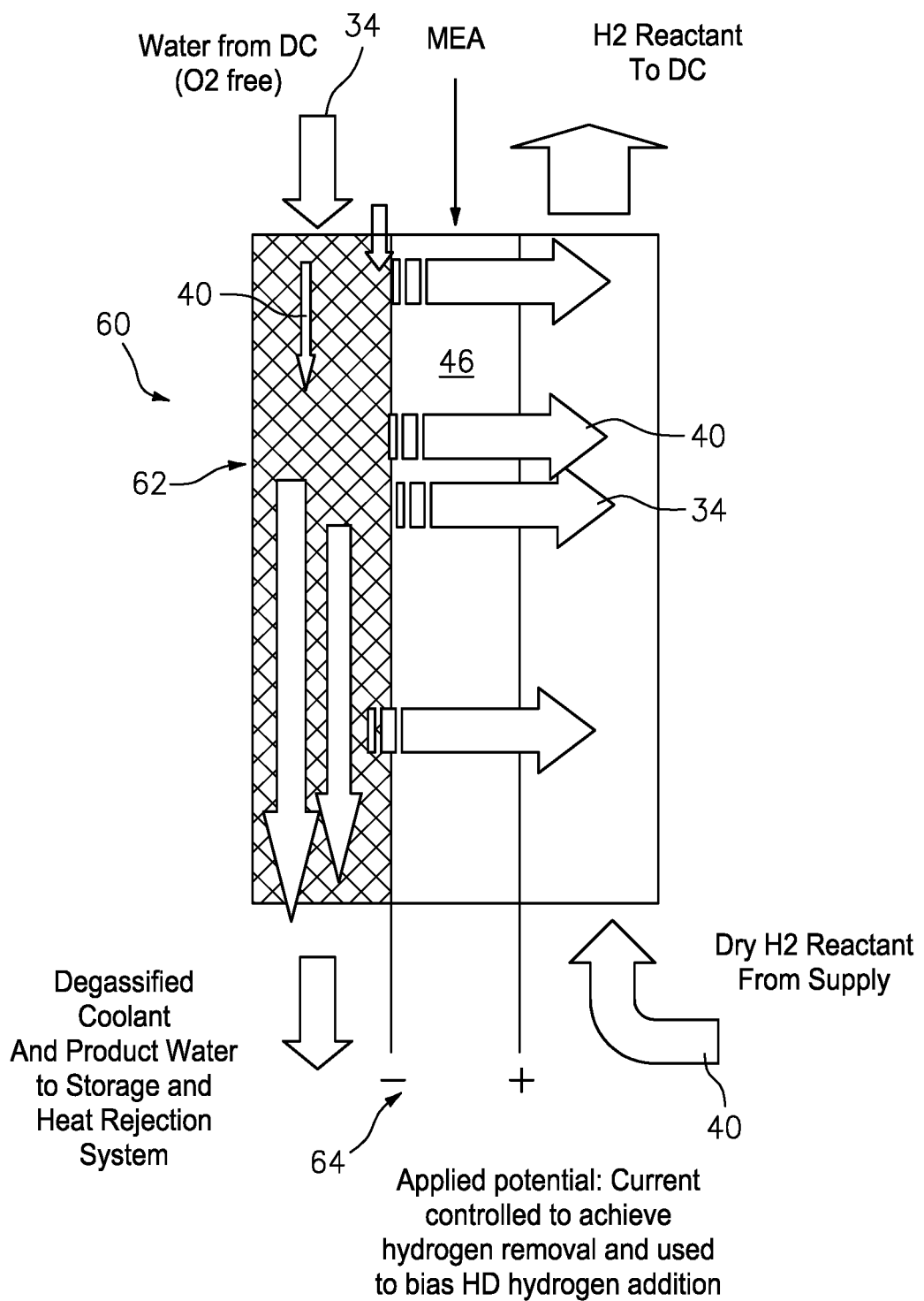
FIG. 7 is a schematic of an exemplary humidifier-degasser portion of a fuel cell stack comprised of stage 1 and stage 2.

Referring also to FIG. 6 and FIG. 7, the product water 34, devoid of oxygen 38 but possibly containing some residual hydrogen 40, flows from the H-ORC 44 to a humidification-hydrogen removal cell (H-HRC) 60. Both illustrations in FIG. 7 and FIG. 8 illustrate capability to conduct humidification and degasification, albeit with differing gasses in each cell 60.

Figure 8:
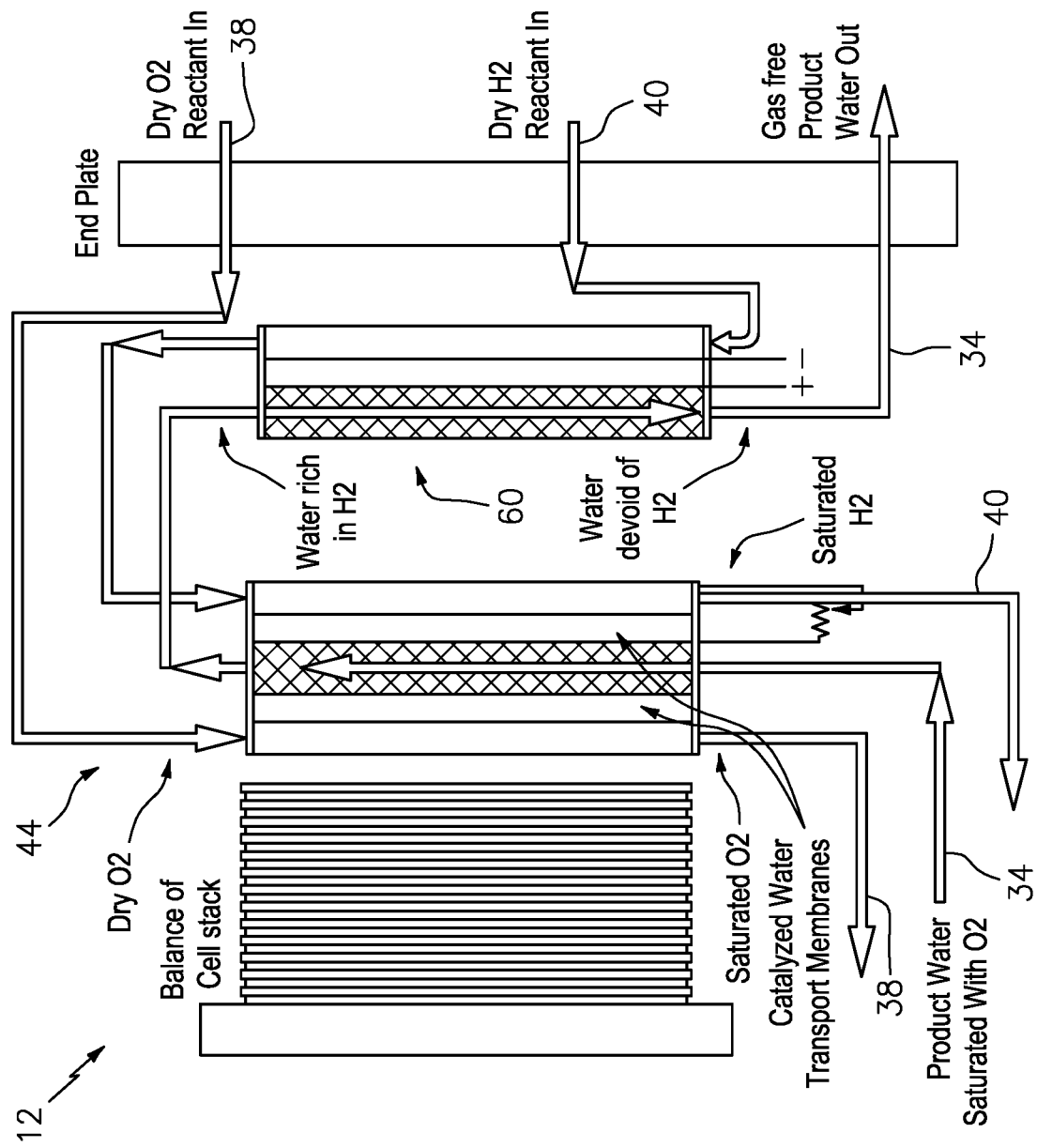
FIG. 8 is a schematic of an exemplary humidifier-degasser cell section of a fuel cell stack comprised of the humidifier oxygen removal cell section and the humidifier hydrogen removal cell section.

Referring to FIG. 8, the humidification-hydrogen removal cell 60 performs two functions. The humidification-hydrogen removal cell 60 removes residual hydrogen 40 from the product water 34 and provides a control signal that may feed back to the humidifier-oxygen removal cell 44 injector circuit 48 that adjusts the rate of hydrogen 40 addition to the water in the humidifier-oxygen removal cell 44. Residual dissolved hydrogen 40 is removed electrochemically from the product water stream 34. The hydrogen 40 is electrochemically pumped from a low partial pressure in the water 34 to reactant pressure in the fuel stream 40 to the cell stack 12. FIG. 7 shows the humidification-hydrogen removal cell 60 and the hydrogen removal process.

In FIG. 7 the humification-hydrogen removal cell 60 consists of a product water chamber 62 separated from the reactant hydrogen 40 by the MEA 46. Application of a small potential 64 to the MEA 46 causes the MEA 46 to scavenge dissolved hydrogen 40 from the product water stream 34 and electrochemically pump the hydrogen 40 back to the to the gaseous hydrogen reactant stream 40 flowing to the cell stack 12. Controlling the applied potential 64 and monitoring the resultant current, which is directly proportional to hydrogen pumping rate, controls the hydrogen content of the water leaving the humidification-hydrogen removal cell 60. The humidification-hydrogen removal cell 60 current may be used to bias the resistance of the MEA circuit 48 of the humidifier-oxygen removal cell 44. The overall result is an essentially gas-free product water stream 34 with minimal addition of hydrogen 40 to the product water 34 in the humidification cell 44. The control signal and circuit assure only enough hydrogen 40 is added to the product water 34 in the humidifier-oxygen removal cell 44 to completely remove oxygen 38 from the water 34. The humidification-hydrogen removal cell 60 leaves only a small, controlled quantity of hydrogen 40 in the product water 34. As currently configured, the controller 58 limits the residual dissolved hydrogen 40 to a level below the concentration that will cause hydrogen evolution when the product water stream 34 is depressurized. If desired, the computer code managing the rate controller 58 can be adjusted to completely remove hydrogen gas from the product water stream 34.

The proposed innovation includes the cascaded fuel cell stack with its humidifier-degasification section and ICC section provides a technological advance that contributes to system simplicity and improved reliability through (1) innovative, integrated system-level design concepts and (2) passive ancillary components. More specifically: all gas mechanical re-circulation is eliminated and motorized ancillary components are reduced; power plant weight, volume complexity and cost are reduced. Power plant reliability and efficiency are improved. Power plant and PEM membrane durability are both improved. Performance and efficiency of individual PEM cells are improved. Parasite power requirements are reduced. Control and monitoring requirements are reduced. Vehicle-power plant interface connections are simplified.

The fuel cell stack 12 is a non-flow though device that allows input of dry reactant gasses, humidifies the reactants utilizing fuel cell product water, then removes dissolved and gaseous reactants from the product water issuing from the stack so this product water can be easily managed even in zero gravity.

The benefits of the innovative design include allowing all cells within the stack maintain a desired stoic ratio, and concentrating contaminants in the ICC cell so a minimal amount of venting is required. Minimal venting can provide a significant improvement in reactant utilization that is crucial especially in remote space missions.

When the inert concentrator is vented the concentrated nature of the accumulated elements allows for a venting to occur which removes primarily waste as opposed to a waste/hydrogen combination. Illustrated by reference numeral 33 in FIG. 4.

The cascade/ICC combination allows for significantly greater efficiency than either a situation where hydrogen is mechanically pumped or one where hydrogen is expelled along with waste gas at a higher ratio.

The current invention performs electrochemical circulation through as few as just one cell by combining the benefits of a cascade with the benefits of the electrochemical hydrogen pump.

The current invention provides for in-stack degasification of fuel cell product water.

The proposed innovation; the cascaded fuel cell stack with its H-D section and ICC section provides a technological advance that contributes to system simplicity and improved reliability through (1) innovative, integrated system-level design concepts and (2) passive ancillary components. All gas mechanical re-circulation is eliminated and motorized ancillary components are reduced. Power plant weight, volume complexity and cost are reduced. Power plant reliability and efficiency are improved. Power plant and PEM membrane durability are both improved. Performance and efficiency of individual PEM cells is improved. Parasite power requirements are reduced. Control and monitoring requirements are reduced. Vehicle power plant interface connections are simplified.

There has been provided a non-flow through fuel cell. While the non-flow through fuel cell has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A fuel cell comprising:
a hydrogen removal cell coupled to a fuel inlet, an oxidant inlet and a product water inlet configured to flow liquid water, said hydrogen removal cell comprising a membrane electrode assembly between a product water flow passage configured to flow liquid water and a fuel flow passage, an electrical potential being applied across said membrane electrode;
an oxidant flow passage coupled to a first catalyzed water transport membrane opposite said product water flow passage;
the fuel flow passage coupled to a second catalyzed water transport membrane opposite said product water flow passage;
an electronic hydrogen rate controller electrically coupled to said second catalyzed water transport membrane; and
at least one inert concentrator cell coupled to at least one cell in a cascaded cell stack, said inert concentrator coupled to a stack vent and configured to discharge contaminants from said fuel cell; wherein the hydrogen removal cell is located within the cascaded cell stack.

2. The fuel cell according to claim 1, wherein said at least one inert concentrator cell comprises a hydrogen pump; said hydrogen pump comprising a membrane electrode assembly with an input chamber coupled to an anode chamber configured as a fuel flow passage from at least one cell in said cascaded cell stack and said membrane electrode assembly having an output coupled to a fuel inlet manifold of said at least one cell.

3. The fuel cell according to claim 2, wherein said inert concentrator cell is configured to concentrate contaminant gases in said input chamber and pass hydrogen gas across said membrane electrode assembly of the hydrogen pump into said fuel inlet manifold.

4. The fuel cell according to claim 1, wherein said cascaded cell stack includes reactants flowing serially.

5. The fuel cell according to claim 4, wherein said reactants comprise a gaseous fuel and a gaseous oxidant.

6. The fuel cell according to claim 5, further comprising:
a humidifier cell coupled downstream of said hydrogen removal cell, said humidifier cell comprising a first catalyzed water transport membrane and second catalyzed water transport membrane separated by a product water flow passage, wherein said humidifier is configured to add moisture to said oxidant and to add moisture to said fuel responsive to an electrical current controlled by said electronic hydrogen rate controller.

* * * * *